United States Patent [19]
Dannert et al.

[11] 3,794,731
[45] Feb. 26, 1974

[54] PROTEIN FIBER FABRICATION PROCESS

[75] Inventors: Robert D. Dannert, Wayzata; Michael E. Manwaring, Minneapolis, both of Minn.

[73] Assignee: General Mills, Inc., Minneapolis, Minn.

[22] Filed: Apr. 21, 1972

[21] Appl. No.: 246,292

[52] U.S. Cl. .................... 426/276, 264/83, 426/802
[51] Int. Cl. .............................................. A23j 3/00
[58] Field of Search .. 99/14, 17, 18, 20; 260/112 R; 264/83

[56] References Cited
UNITED STATES PATENTS
2,682,466  6/1954  Goter........................................ 99/14

Primary Examiner—A. Louis Monacell
Assistant Examiner—James Robert Hoffman

[57] ABSTRACT

Protein fibers are prepared by forcing an alkaline protein solution through an orifice and simultaneously intimately contacting the protein stream with a fast acting acid gas traveling at a velocity greater than the protein stream. The fibers find particular use in meat analog preparations.

12 Claims, 5 Drawing Figures

PATENTED FEB 26 1974 3,794,731
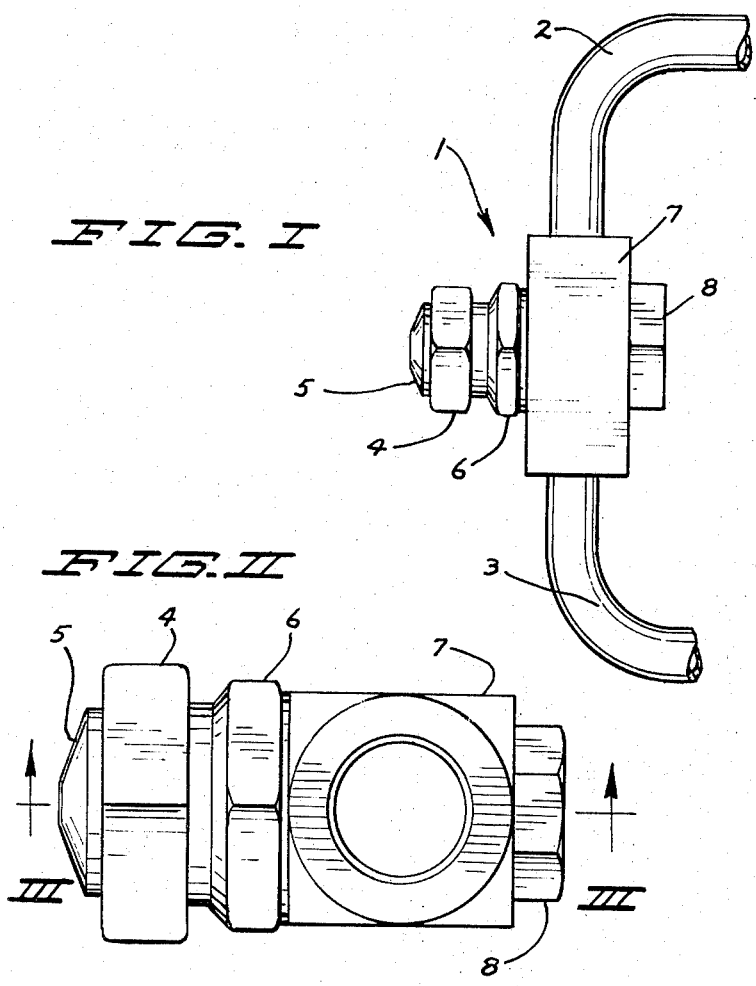
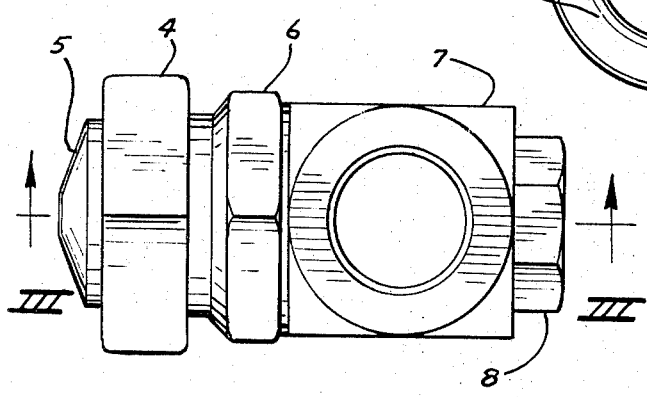
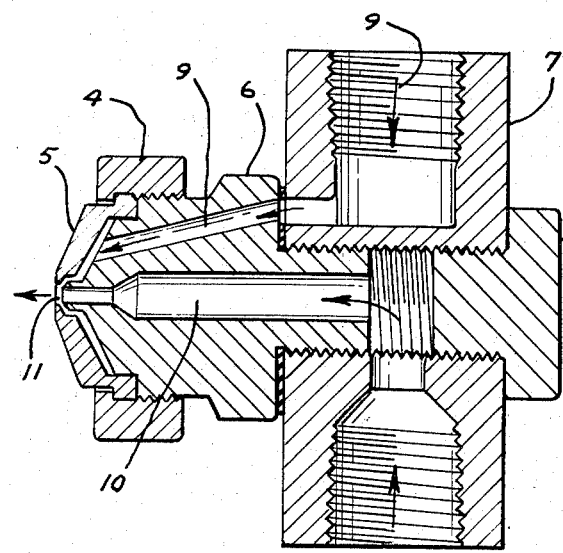
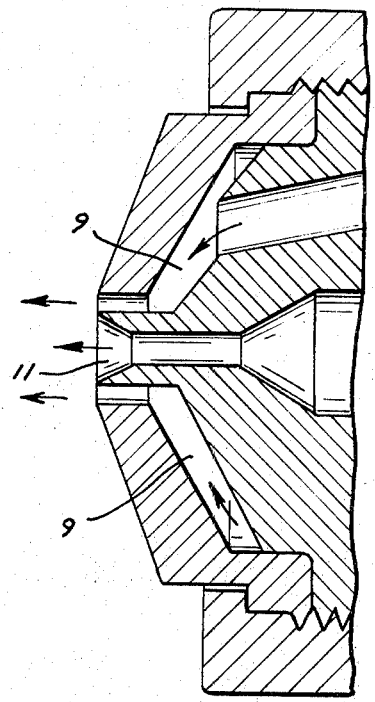
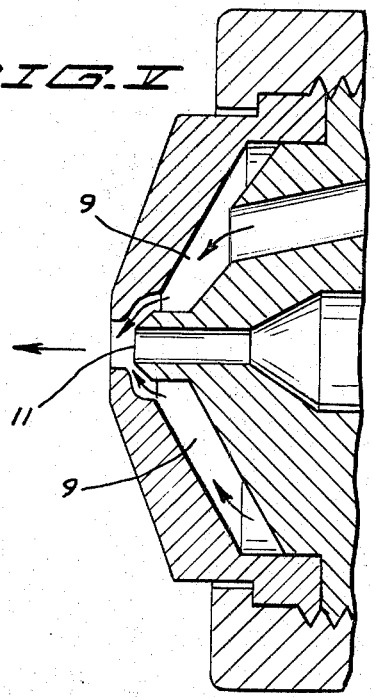

PROTEIN FIBER FABRICATION PROCESS

The present invention relates to a process for forming protein fibers and foods incorporating such fibers. More particularly, it relates to such a process wherein a stream of a protein containing alkaline dope is contact with a stream of an acid gas to yield a mat of fibers in random arrangement.

In recent years a great deal of effort has been expended on the production of texture retaining protein matrices as building blocks for a new series of foods, many of which have been so fabricated to simulate natural cuts of cooked meat, fish, fowl and the like. The early work of Robert A. Boyer as set forth in U.S. Pat. No. 2,683,466 has been extensively followed in this respect. In general, the Boyer process involved the preparation of a spinnable protein dope with subsequent forcing of the dope through a spinnerette to yield a tow of monofilament fibers. The fibers were caused to set-up or coagulate by immersion of the spinnerette in an acid coagulating bath to lower the pH of the immerging dope to the isoelectric point of the protein. The fibers were oriented by stretching and the pH raised somewhat by washing or neutralization. The tow of fibers could then be used through admixture with binders, flavors, fats or oils, coloring agents and the like along with subsequent heat treatments to yield the indicated fabricated foods.

We have now discovered a new method of preparing protein fibers. In such method a stream or multiplicity of streams of an alkaline solution of protein is intimately contacted with a stream of a fast acting acid gas. The acid gas stream traveling generally in the same direction as the alkaline protein stream or streams but at a higher velocity causes the protein to coagulate thereby yielding a fiber or fibers. The acid gas stream also causes a reduction in the cross-section or diameter of the protein stream and, accordingly, the protein monofilaments have a diameter smaller than the issuing stream of protein solution. It is also possible in accordance with the invention to cause the protein filaments to break into a multiplicity of shorter fibers by increasing the acid gas pressure and thus the velocity to such a point that the forming protein fiber or fibers break due to reduction in cross-section. A still further variation of the invention is to intimately contact a multiplicity of protein containing streams with the fast acting acid gas stream.

In the drawings,

FIG. I is a plane view of apparatus useful in the present invention;

FIG. II is an end view of the nozzle 1 of FIG. I;

FIG. III is a cross-sectional view of the nozzle of FIG. II along lines III—III;

FIG. IV is an enlarged cross-sectional view of the forward portion of one variation of the nozzle of FIG. III; and FIG. V is a cross-sectional view of the forward portion of a second variation of the nozzle of FIG. III.

The starting protein solution can be made from a wide variety of protein source materials. Such proteins must be functional—that is, not heat or otherwise denatured so as to become relatively inactive. Additionally the protein source materials must be capable of forming a pumpable solution and of forming fibers upon being contacted with the acid gas. Preferred proteins for use in our process are the oilseed proteins and casein. Of the oilseed proteins, soy protein isolate is particularly preferred. Sodium caseinate is the particularly preferred form of casein to be used in the invention. The protein source material should have a protein content of at least about 50 percent by weight and preferably at least about 70 percent by weight. The protein content of the source material is interrelated with the protein concentration of the alkaline spinning solution. Thus the solution must contain a sufficiently high protein concentration to form fibers on contact with the acid gas. Preferably the alkaline solution will contain from about 15 to 40 percent by weight protein. When the lower protein content source materials are used, it is sometimes not readily possible to obtain a solution capable of forming fibers without first causing gel formation—i.e., a pumpable solution is not obtained. Thus the interrelationship of the protein content of the protein source material and of the solution becomes apparent. Various combinations of protein source materials can be used. For example sodium caseinate can be used with whey or soy flour. The former combination forms an effective and advantageous way of utilizing the whey proteins and separating same from the carbohydrate or lactose fractions which can be essentially removed on washing of the fibers. It is here noted that the work "solution" has been used to describe the aqueous alkaline protein containing system. Such term is meant to include colloidal solutions as well as dispersions since proteins do not often form so-called true solutions.

The most effective fast acting acid gas is HCl, preferably in an anhydrius state. Mixtures of air and anhydrous HCl have also given good results. The acid gas is used in an amount sufficient to react with the alkaline protein stream to form fibers. Generally, and phrased somewhat differently, the acid gas is used in an amount sufficient to cause the protein to precipitate thus forming fibers according to the instant process. The various proteins normally have different isoelectric points or ranges and thus the quantity of gas varies in relation to the protein source material in the pumpable solution and also as to the pH of the said pumpable solution.

The alkalinity of the pumpable solution is preferably obtained by utilizing an alkli metal hydroxide, and particularly by using sodium hydroxide. Sufficient of the water soluble base is used to solubilize or disperse the protein. Again the quantity of base needed depends somewhat on the particular protein source material or combination of protein source materials. Preferably, a large excess of base is not used since this would require greater quantities of acid gas in order to coagulate and form fibers from the alkaline protein streams. In various of the Examples below, the pH of the solutions is given. This is not necessarily the optimum pH although for any particular protein system there probably is an optimum which could readily be determined by routine experimentation taking into account chemical usage (base, acid), fiber and pumpable protein solution properties and the like.

The protein solution is forced through an orifice having a cross-section or diameter of from about 6 to 50 mils. A multiple of such orifices can be used provided that the acid gas stream comes into intimate contact with all of the issuing protein dope streams. The pressure used to force the protein solution through the orifice is not critical and will, of course, vary somewhat dependent upon the fluidity of the protein solution. The acid gas pressure likewise is not critical, it being sufficient to provide a gas stream having a velocity greater than that of the protein stream. The greater flow of the gas pulls the protein stream and thus reduces the cross-section or diameter thereof while precipitating the protein in the stream. Preferably, the diameter or cross-section is reduced by the acid gas to about one-half to one-fiftieth of its initial size. The gas stream may also desirably break the forming filament strand or strands yielding shorter length fibers. Such breakage is intermittent where the gas pressure and velocity are relatively high—the cross-section or diameter of the forming fibers is reduced to the point where breakage occurs periodically. Good results have been obtained at gas pressures of about 5 to 100 p.s.i.g.

The process of the invention is preferably carried out at room temperature although higher and lower temperatures may be used. In this respect, it may be desirable with some protein solutions to heat the same somewhat in order to avoid gelatin and/or to increase flow. Such heating should, however, not denature the protein to any appreciable extent and it is preferable to maintain the elevated temperature, when used, to below about 160°F. It may also be desirable with such protein solutions to maintain the spraying appartus, including feed lines, at the temperatures above room temperature, such as by the use of heat wraps. The fiber receiving area may also be at temperatures above room temperature. Heating of the forming or formed fibers may increase the strength thereof although ordinarily the fibers have sufficient strength without heat treatment.

The receiving area can be any surface which is sufficiently far away from the issuing stream of protein solution to allow fiber formation by interaction with fast acting gas. This distance is accordingly not critical and the minimum varies somewhat with the protein solution-acid system being used. Preferably the receiving surface is in the range of from 1 to 5 feet from the atomizing nozzle. The receiving surface may also be coated with Teflon to facilitate the removal of the fibers therefrom. Preferably, and especially when the system is to be operated continuously, the receiving surface is equipped with means such as a scraper to remove the mat of formed fibers. A further preferred receiver is a rotating bucket or drum which can be operated at a speed which is in excess of the speed of the forming fibers. Thus the rotating surface stretches the fibers to a degree giving an improvement in their tensile strength and a reduced fiber diameter. Such drum can also be equipped with means to continuously remove the formed fibers.

The formed fibers may also be optionally subjected to various after-treatments. Thus, where it is desired to reduce the acidity of the fibers, the same may be washed with water and/or neutralized to the desired extent by treatment with a base—i.e., aqueous $NaHCO_3$, NaOH, etc. The pH of the fibers is desirably in the range of 4–6.5 for preparation of meat analogs. Setting baths made up of aqueous solutions of salts and the like may be employed, primarily to improve the strength of the fibers.

A variety of additives can be included in the protein solution. Thus gums can be added to add stability to the solutions. Plasticizers such as glycerol can be included to yield increased plasticity in the formed fibers. Inorganic and organic reducing agents such as sodium sulfites and bisulfites can be added in small amounts to the solution. Such agents affect the solution viscosity and the whiteness of the forming fibers. Additionally, coloring and flavoring agents may be included for their known function. A further highly useful aspect of the invention is that oils and fats can be included in the protein solution thus yielding fibers having internally incorporated oils or fats. Bulking agents such as carbohydrates, Maltrin and the like can be inlcuded. Such materials may also increase the water absorbing characteristics of the fibers.

It is further conceivable in accordance with the present invention to construct a product in one operation. In this respect the fibers (with or without additives such as flavors, colors, fats or oils and the like) can be formed while separate sources of other materials, such as binders, flavors, colors, fats or oils, etc, are also sprayed onto the receiving surface. The composite mat can then be removed from the receiving surface to yield the final product in one operation. Where a heat setting binder is added, the composite product can be subjected to heating to set the binder.

As indicated previously the separately formed fibers prepared in accordance with the invention can be advantageously used to prepare textured food products. Thus the same can be mixed with conventional additives—i.e., flavors, coloring agents, fats or oils, binders etc.—to yield products which may desirably be analogous to natural products or which may be completely new forms of textured foods.

In FIGS. I-V of the drawings, the atomizing nozzle 1 is connected to pressurized acid gas line 2 and a pressurized protein solution line 3. The hexagon retainer ring 4 holds the gas cap or nozzle 5 in position in conjunction with the fluid nozzle 6 on the main body 7 of the atomizing nozzle 1. The plug 8 completes the nozzle construction. The pressurized acid gas stream 9 causes the protein solution stream 10 to form the fibers which are formed prior to striking a receiving surface.

The orifice 11 for the exiting protein solution has a cross-section or diameter of from about 6 to 50 mils as set forth above. FIG. IV shows one orifice 11 which is fluted and, in such nozzle construction, the acid gas stream 9 leaves the atomizing nozzle in a generally parallel relationship with the exiting protein solution stream. Such nozzle construction was used in all of the Examples to follow except Examples VII and XXIV. FIG. V shows a second orifice 11 which is not fluted and, in such nozzle construction, the acid gas stream 9 leaves the atomizing nozzle at an angle impinging upon the exiting protein solution such protein solution stream. Said nozzle construction of FIG. V was used in Examples VII and XXIV which follow.

The following examples illustrate specific embodiments of the invention without being limiting. All percents and parts are by weight unless otherwise indicated. Likewise distilled water and a Teflon coated receiving surface was used in all of the Examples unless otherwise indicated.

EXAMPLE I a protein solution was made up by mixing the following:

| | |
|---|---|
| Na caseinate | 400 gm. |
| $H_2O$ | 1550 gm. |
| 40% aqueous NaOH | 30 ml. |

The solution had a pH of approximately 12 and a protein content of about 20 percent. It was sprayed onto the receiving surface at a distance of approximately one foot using a pressure of 20 p.s.i.g. and an anhydrous HCl pressure of 25 p.s.i.g. A gas fired heater was utilized to heat was utilized to heat the target area to temperatures in the range of 150°–250°F. Very good fibers were formed which varied in diameter from about 60 to 250 microns (i.e., 2.4 to 10 mils).

EXAMPLE II

Example I was essentially repeated except the amount of NaOH solution was varied to yield solutions having a pH of approximeately 10 and 11, respectively. The pH 10 solution was much more viscous than the pH 11 solution. However, the pH 10 solution yileded very uniform fibers which had a small diameter and were quite strong. The pH 11 solution yielded fibers which were coarser and uneven in diameter.

EXAMPLE III

A protein solution was made up by mixing 205 g. Na caseinate, 410 g. non-fat dry milk solids with 1,350 ml. $H_2O$. The pH of the resulting solution was raised from 6.5 to 9.5 with 40 percent aqueous NaOH and the solution was also heated to about 55°C. The pH adjusted solution containing approximately 10 percent sodium caseinate and 20 percent non-fat dry milk solids was then sprayed as in Example I at a pressure of 20 p.s.i.g. and an anhydrous HCl pressure of 10 p.s.i.g. (mixed with 2 p.s.i.g. air pressure). Fibers of very good quality were formed.

EXAMPLE IV

A protein solution was prepared by mixing the following:

| | grams |
|---|---|
| Na caseinate | 250 |
| Soy flour (50% protein) | 250 |
| NaOH (3.56 N) | 204 |
| $H_2O$ | 1296 |

The solution was sprayed as in Example III to yield good fibers.

EXAMPLE V

Example IV was essentially repeated using a protein solution prepared by mixing the following:

| | |
|---|---|
| Na caseinate | 30 gm. |
| Peanut concentrate (70% protein) | 60 gm. |
| $H_2O$ | 200 gm. |
| NaOH (10 N) | 10 ml. |

Light beige colored fibers with some lobing were formed from the solution.

EXAMPLE VI

A protein solution having a pH of approximately 12.65 was prepared by mixing the following:

| | |
|---|---|
| Na caseinate | 95 gm. |
| Liquid cottage cheese whey (6% solids and 0.65% protein) | 260 gm. |
| NaOH (10 N) | 20 ml. |

The solution was sprayed under a pressure of 50 p.s.i.g. and an anhydrous HCl pressure of 10 p.s.i.g. High quality fibers were obtained.

EXAMPLE VII

Two protein containing solutions were made up as follows:

| | A | B |
|---|---|---|
| Na caseinate | 420 gm. | 400 gm. |
| Whey conc. (30% solids— 66% of solids being protein) | 560 gm. | 800 gm. |
| $H_2O$ | 970 gm. | 750 gm. |
| NaOH (10 N) | 35 ml. | 50 ml. |

The solutions then had the following make-up:

| | A | B |
|---|---|---|
| Solids | ≈29% | ≈31% |
| Protein | ≈26.6% | ≈28% |
| Lactose | ≈2.45% | ≈3.67% |
| pH | 10.5 | 11.0 |

The solutions were heated and sprayed using a pressure of 325 p.s.i.g. and an anhydrous HCl pressure of 10–15 p.s.i.g. Excellent fibers were obtained from both solutions A and B, the fibers from the former having an average diameter of 1.9 mil and those from the latter an average diameter of 4 mil. The fibers from solution B had a moisture content of 51.47 percent and a lactose content of 1.85 percent. They were then placed in a set bath (made up as in Example XXIII below) and washed well with water. Strength of the set fibers was increased and they analyzed 63.03 percent water and 0.02 percent lactose. The water washing reduced the strength below that of the unset fibers. This example thus shows that fibers can be obtained from a relatively high amount of whey solids and that water washing effectively removes substantially all of the lactose. When the amount of whey conc. was increased to 1,300 gm. and the sodium caseinate reduced to 340 gm., the solution gelled and thus could not be sprayed.

EXAMPLE VIII

A protein containing solution (approximately 25 percent protein) was prepared by mixing the following:

| | grams |
|---|---|
| Na caseinate | 500 |
| NaOH (3.65 N) | 204 |
| $H_2O$ | 1296 |

The solution (at room temperature) had a pH of 9.76 and was sprayed as in Example I. Excellent fibers were obtained when the target area was not heated and when it was heated to approximately 250°F. However, the latter fibers were somewhat stronger.

EXAMPLE IX

A protein solution was prepared from the following ingredients:

| | |
|---|---|
| Soy isolate (90–95% protein Promine R) | 440 gm. |
| $H_2O$ | 1380 ml. |
| NaOH (10 N) | 180 ml. |

One half of the soy isolate was slurried into the water and then two-thirds of the NaOH was added. The mixture was heated to 50°C. and then the remainder of the NaOH and soy isolate were slowly added with continued mixing. The solution temperature was raised to 60°C. and the same was centrifuged. The solution was sprayed at a pressure of 10 p.s.i.g. and an anhydrous HCl pressure of 15 p.s.i.g. (the solution temperature and the spray apparatus was maintained at 60°C.). Very fine fibers which were fairly strong were obtained.

EXAMPLE X

Example IX was essentially repeated using the following protein containing solution:

| | |
|---|---|
| Soy isolate R) | 100 gm. |
| $H_2O$ | 281 gm. |
| NaOH (10 N) | 23 ml. |
| Ammonium sulfite | 1 gm. |

The resulting solution was smoother than the solution of Example IX and the resulting fibers were white in color (in comparison to the fibers of Example IX which had a greenish hue). Thus the ammonium sulfite improves solution viscosity and fiber color.

EXAMPLE XI

Example X was essentially repeated using the following ingredients:

| | |
|---|---|
| Soy isolate (Promine R) | 600 gm. |
| $H_2O$ | 1686 gm. |
| NaOH (10 N) | 108 ml. |
| Ammonium sulfite | 6 gm. |

Again good fibers were obtained.

EXAMPLE XII

A protein solution was prepared by blending 100 gm. cottonseed protein isolate (90 percent protein) with 270 g. water and 1.0 g. ammonium sulfite. Then 29 ml. 10 N NaOH was added and blending (with heating to 65°C.) was continued until the solution was smooth. The solution having a pH of approximately 12.6 was sprayed at a pressure of 50 p.s.i.g. and an anhydrous HCl pressure of 5–10 p.s.i.g. Fibers which were quite weak were obtained. The strength of the fibers could probably be increased by increasing the protein content, using less base, using an aftertreatment such as heat or setting bath etc.

EXAMPLE XIII

Example VI was essentially repeated using the following protein containing solution:

| | |
|---|---|
| Na caseinate | 100 gm. |
| Liquid cottage cheese whey (See Example VI) | 240 gm. |
| NaOH (10 N) | 20 ml. |
| Glycerol | 40 gm. |

Very good fibers were obtained. The glycerol acts as a plasticizer for the fibers.

EXAMPLE XIV

Example XIII was essentially repeated using a protein solution prepared from the following:

| | |
|---|---|
| Na caseinate | 90 gm. |
| Liquid cottage cheese whey 230 gm. (See Example VI) | |
| Glycerol | 40 gm. |
| Gum arabic | 20 gm. |
| NaOH (10 N) | 20 ml. |

Very nice fibers were formed. They were extremely long, uniform in diameter and quite flexibel and strong. The gum arabic increases the viscosity of the solution thus impriving the spraying somewhat.

EXAMPLE XV

Example XIV was essentially repeated using a protein solution prepared from the following ingredients:

| | |
|---|---|
| Na caseinate | 80 gm. |
| $H_2O$ | 313 gm. |
| NaOH (10 N) | 8 ml. |
| Carboxymethyl cellulose gum | 1 gm. |

Again excellent fibers of very small diameter were obtained.

EXAMPLE XVI

Example XIV was essentially repeated using a protein solution prepared from the following ingredients:

| | |
|---|---|
| Na caseinate | 80 gm. |
| $H_2O$ | 270 ml. |
| NaOH (10 N) | 25 ml. |
| Maltrin 10 | 20 gm. |

Good fibers were obtained with the polysaccharide acting as a bulking agent.

EXAMPLE XVII

Example XVI was essentially repeated using the following:

| | |
|---|---|
| Na caseinate | 100 gm. |
| $H_2O$ | 280 ml. |
| NaOH (10 N) | 20 ml. |
| Larch tree gum | 1 gm. |

Good fibers were obtained.

EXAMPLE XVIII

A protein containing solution was prepared from the following ingredients:

| | |
|---|---|
| Na caseinate | 120 gm. |
| $H_2O$ | 225 gm. |
| NaOH (10 N) | 15 ml. |
| Corn oil | 40 gm. |

This oil containing solution was sprayed at a pressure of 50 p.s.i.g. and an anhydrous HCl pressure of 5 p.s.i.g. Excellent fibers were obtained. Increasing the amount of oil and concurrently reducing the amount of water produced solutions which were too viscous to spray.

EXAMPLE XIX

A protein solution was prepared by mixing the following:

| | |
|---|---|
| Soy isolate (Promine R) | 100 gm. |
| Bacon fat (melted) | 20 gm. |
| NaOH (10 N) | 20 ml. |
| Ammonium sulfite | 1 gm. |
| $H_2O$ | 259 gm. |

High-quality fibers with a slight bacon aroma were obtained when the above solution was sprayed.

EXAMPLE XX

The following ingredients were blended to yield a sprayable protein solution:

| | |
|---|---|
| Soy isolate (Promine R) | 500 gm. |
| $H_2O$ | 1285 gm. |
| Glycerol | 100 gm. |
| NaOH (10 N) | 100 ml. |
| Guar gum | 10 gm. |
| Ammonium sulfite | 5 gm. |

The solution had a very high viscosity but yielded good fibers which were somewhat weak.

EXAMPLE XXI

Colored fibers were obtained by spraying the following protein solution:

| | |
|---|---|
| Soy isolate (Promine R) | 500 gm. |
| NaOH (10 N) | 100 ml. |
| Glycerol | 100 gm. |
| Ammonium sulfite | 5 gm. |
| Red No. 2 (1% aqueous solution) 20 ml. | |
| Red No. 3 (1% aqueous solution) | 20 ml. |
| H₂O | 1255 gm. |

The fibers were sprayed ontp the inner side surface of a 10 inch diameter stainless steel bucket being rotated at 800 rpm. The fibers were sprayed at a pressure of 300 p.s.i.g. and an anhydrous HCl pressure of 20 p.s.i.g. Exceedingly long, thin, oriented strong fibers were obtained (the rotating bucket stretched the forming fibers). The fibers were also very red.

Similar results were obtained when casein based fibers were collected on revolving roller which stretched the forming fibers. The oriented fibers had a reduced diameter and increased strength.

EXAMPLE XXII

A protein solution was madeup as in Example XXI with coloring from the following:

| | |
|---|---|
| Soy isolate (Promine R) | 750 gm. |
| NaOH (10 N) | 150 ml. |
| Glycerol | 150 gm. |
| Ammonium sulfite 7.5 gm. | |
| H₂O | 1922 gm. |
| Red No. 3 (1 % aqueous solution) | 9 gm. |
| Red No. 2 (1 % aqueous solution) 6 gm. | |
| Caramel (1 % aqueous solution) 7 gm. | |

The solution was sprayed at a pressure of 250 p.s.i.g. and an anhydrous HCl pressure of 5 p.s.i.g. using four nozzles. The fibers were collected in on the inner surface of a bucket rotating at 800–900 rpm. A portion of the resulting fibers were placed first in a set bath for 30 seconds (176°F—set bath made up of 88.82 percent water, 9.40% NaCl and 1.78 percent acetic acid) and then consecutively for 30 seconds in 1 percent, 2 percent and 4 percent aqueous solutions of NaHCO₃. The neutralized fibers were then stored in cold tap water. They were weaker than control fibers which were not placed in the set bath or neutralized. However, the control fibers were very acid and sour whereas the neutralized fibers were bland in flavor.

EXAMPLE XXIII

Example XXII was essentially repeated except that the set bath was replaced by the following aqueous salt solutions:

| | |
|---|---|
| MgSO₄, anhydrous | 262.3 gm. |
| Na₂SO₄, anhydrous | 375.0 gm. |
| H₂SO₄, conc. | 19.43 gm. |
| H₂O | 3093.3 gm. |

Substantially the same results as in Example XXII were obtained.

EXAMPLE XXIV

A protein solutin was prepared by blending the following ingredients:

| | |
|---|---|
| Na caseinate | 120 gm. |
| NaOH (10 N) | 16 ml. |
| H₂O | 264 gm. |

The solution was sprayed at a pressure of 300 p.s.i.g. and an anhydrous HCl pressure of 25 p.s.i.g. into a rotating (2,000 rpm) 11 inch bucket. Exceedingly fine, uniform fibers were obtained. The nozzle used in the Example seemed to cut down on the HCl usage.

EXAMPLE XXV

A pork flavored analog was prepared by mixing the following ingredients and then cooking the mixture for approximately four minutes in a steam jacketed cooker:

| | grams |
|---|---|
| Fibers of Example XIX | 150.0 |
| Lard | 100.0 |
| H₂O | 35.0 |
| Dried egg albumin | 15.0 |
| NaCl | 5.0 |
| Sugar | 3.6 |
| Butter flavoring | 0.1 |
| Garlic powder | 0.1 |
| White pepper | 0.09 |
| Celery powder 0.02 | |
| Onion powder | 0.7 |
| Monosodium glutamate | 1.2 |
| Wheat flour 5.0 | |
| Hydrolized vegetable protein | 1.5 |
| Soluble pepper flavor 0.02 | |
| Natural pork flavor | 5.0 |

The pork flavored analog had good texture and flavor.

EXAMPLE XXVI

A ham flavored analog was prepared by the procedure of Example XXV from the following ingredients:

| | grams |
|---|---|
| Fibers of Example XXIII | 55.3 |
| Ham flavors | 5.42 |
| Dried egg albumin | 3.93 |
| Wheat flour | 3.61 |
| Brown sugar | 1.89 |
| Hydrolyzed vegetable protein | 1.80 |
| Promine R | 1.42 |
| NaCl | 1.18 |
| White pepper | .01 |
| Bacon fat | 6.00 |
| H₂O | 17.00 |

Again the simulated product had good texture and flavor. It is here noted that products simulating chicken, beef, fish and the like can be prepared utilizing the fibers of the present invention and various flavors, colors, binders, etc.

The embodiments of the invention in which an exclusive property or privilege is claimed are defined as follows:

1. A process for preparing protein fibers comprising forcing an aqueous alkaline solution of a protein source material having a protein content of at least about 50 percent by weight through an orifice having a cross-section of from about 6 to 50 mils and simultaneously intimately contacting the alkaline protein stream with a stream of a fast acting acid gas in an amount sufficient to coagulate the protein and form the protein fibers, the velocity of the said gas stream being greater than the velocity of the protein stream.

2. The process of claim 1 wherein the fast acting acid gas is hydrochloric acid.

3. The process of claim 1 wherein the protein source material is sodium caseinate.

4. The process of claim 3 wherein the sodium caseinate is used in combination with a second protein source material.

5. The process of claim 4 wherein the second protein source material is whey.

6. The process of claim 1 wherein the protein source material is soy isolate.

7. The process of claim 1 wherein the forming protein fibers are propelled to a rotating receiving surface which stretches and thus orients the fibers.

8. The process of claim 1 wherein the fibers are neutralized.

9. The process of claim 1 wherein the fibers are immersed in an aqueous setting bath.

10. The process of claim 1 wherein the fibers are subjected to a heat treatment to improve the strength thereof.

11. The process of claim 1 wherein the alkaline solution is obtained through the use of sodium hydroxide.

12. The process of claim 1 wherein the alkaline solution contains one or more additives selected from flavors, coloring agents, gums, plasticizers, bulking agents, fats, and oils.

* * * * *

UNITED STATES PATENT OFFICE
CERTIFICATE OF CORRECTION

Patent No. 3,794,731  Dated February 26, 1974

Inventor(s) Robert D. Dannert et al.

It is certified that error appears in the above-identified patent and that said Letters Patent are hereby corrected as shown below:

Column 1, line 7, "contact" should read -- contacted --; line 15, "2,683,466" should read -- 2,682,466 --. Column 2, line 25, "work" should read -- word --; line 31, "anhydrius" should read -- anhydrous --. Column 3, line 19, "gelatin" should read -- gelation --. Column 4, line 4, "function" should read -- functions --; line 8, "inlcuded" should read -- included --; line 51, "solution such" should read -- solution stream thus providing somewhat more intimate contact with such --. Column 5, lines 5 and 6, "was utilized to heat was utilized to heat the" should read -- was utilized to heat the --; line 14, "approximeately" should read -- approximately --; line 16, "yileded" should read -- yielded --. Column 6, line 44, "(3.65 N" should read -- (3.56 N) --. Column 7, line 60, "230 gm." should be centered under column; line 67, "impriving" should read -- improving --. Column 9, lines 11, 12, 13, "20 ml., 20 ml., and 1255 gm." should be centered under column; line 14, "ontp" should read -- onto --; lines

UNITED STATES PATENT OFFICE
CERTIFICATE OF CORRECTION

Patent No. 3,794,731     Dated February 26, 1974

Inventor(s) Robert D. Dannert et al.     Page - 2

It is certified that error appears in the above-identified patent and that said Letters Patent are hereby corrected as shown below:

32, 35, 36, "7.5 gm., 6 gm., 7 gm." should be centered under column; line 55, "solutions:" should read -- solution: --. Column 10, lines 22, 24, 25, 27, "0.02, 5.0, 1.5, 0.02" should be centered under column entitle "grams"; lines 38, "3.93" should read -- 3.92 --.

Signed and sealed this 19th day of November 1974.

(SEAL)
Attest:

McCOY M. GIBSON JR.          C. MARSHALL DANN
Attesting Officer            Commissioner of Patents